Figure 1B:
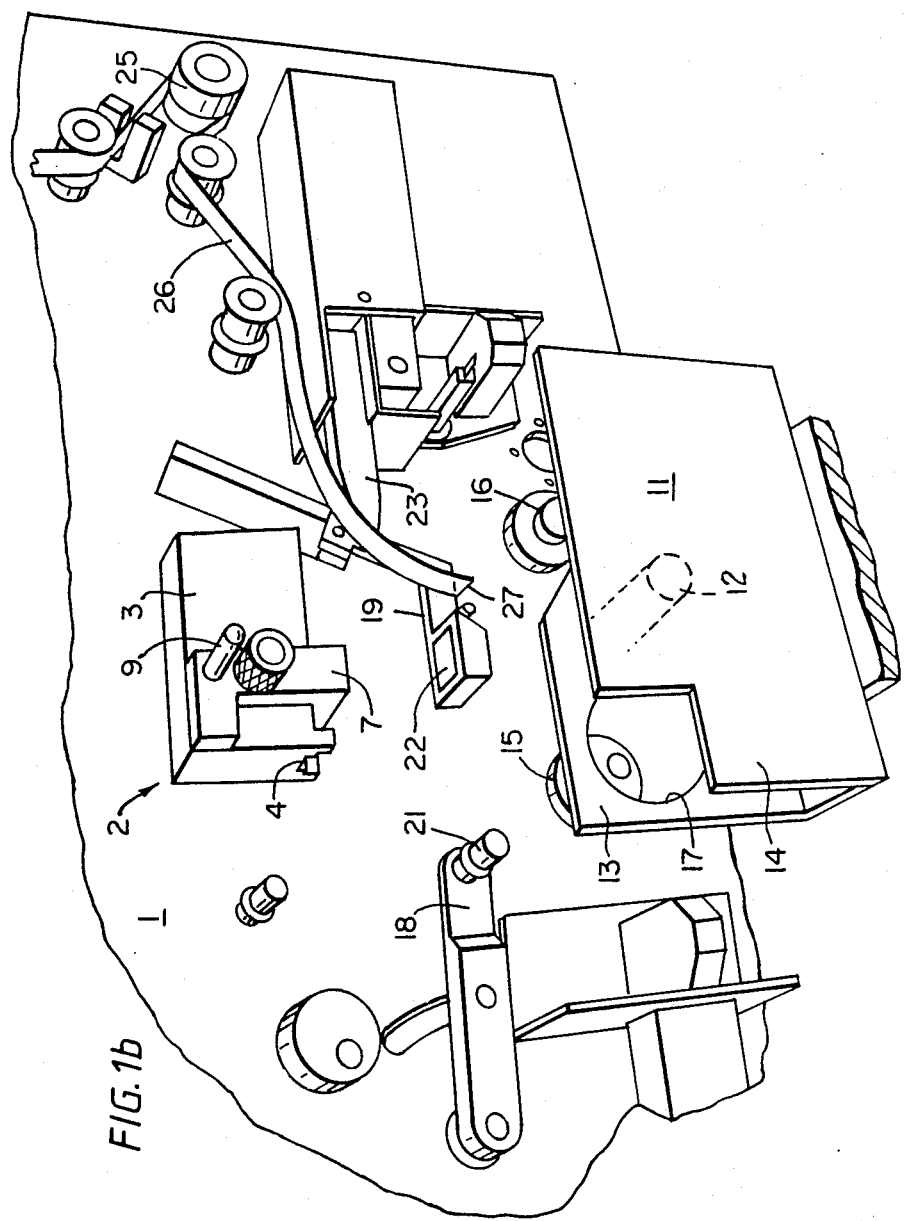

United States Patent [19]

Gardner

[11] Patent Number: 4,911,774

[45] Date of Patent: Mar. 27, 1990

[54] SPLICING AND LOADING OF TAPE INTO CASSETTES WITH A STATIONARY SPLICING BLOCK

[75] Inventor: John P. Gardner, London, England

[73] Assignee: Tape Automation, Ltd., Essex, United Kingdom

[21] Appl. No.: 890,078

[22] Filed: Jul. 24, 1986

[30] Foreign Application Priority Data

Jul. 24, 1985 [GB] United Kingdom ............... 8518748

[51] Int. Cl.$^4$ ...................... B65H 19/20; G03D 15/04
[52] U.S. Cl. ................................... 156/159; 156/505; 156/506; 156/304.3
[58] Field of Search ............... 156/502, 505, 506, 159, 156/304.3; 242/56 R

[56] References Cited

U.S. PATENT DOCUMENTS

| 3,558,405 | 1/1971 | Seda | 156/506 |
| 3,888,480 | 6/1985 | Bagozzi | 156/506 X |
| 4,486,262 | 12/1984 | Woodley | 156/502 |

FOREIGN PATENT DOCUMENTS

| 1360739 | 2/1972 | United Kingdom . |
| 1589699 | 11/1977 | United Kingdom . |
| 1577037 | 10/1980 | United Kingdom . |
| 2093801 | 1/1981 | United Kingdom . |

Primary Examiner—Michael W. Ball
Assistant Examiner—Jeff H. Aftergut
Attorney, Agent, or Firm—Ross, Howison, Clapp & Korn

[57] ABSTRACT

Apparatus for loading use tape (e.g. magnetic tape for video recording and playback) into leadered (e.g. V-zero) cassettes comprises a stationary splicing head 3 having an undersurface provided with a tape-receiving groove 4. A pair of vacuum shoes 5 and 6 serve to retain tape releasably in the groove and are connected to a vacuum source within the casing of the apparatus. A slitting head 7 operates from an internal pneumatic power source on shaft 9, the blade 8 of the head 7 running in a slot traversing the groove 4. In use, leader tape 20 is extracted from the cassette by leader extraction arm 18 and lift arm 19 and disposed in the groove 4. Slitting head 7 then operates to slit the tape into two lengths retained in groove 4. Use tape 26 previously placed in groove 4 and cut so that end 27 thereof is adjacent the groove for the blade 8 is sandwiched against the head 3 by the leader tape. Lift arm 19 and extract arm 18 then lower, the right hand end of the leader tape exposing the use tape in the groove. Splicing tape is then applied to the abutting ends of the use tape and leader tape and a winding cycle draws tape into the cassette until a predetermined length of use tape has been drawn onto the hub of the cassette. A similar slitting and splicing operation then takes place to complete the operations to produce a loaded cassette.

6 Claims, 7 Drawing Sheets

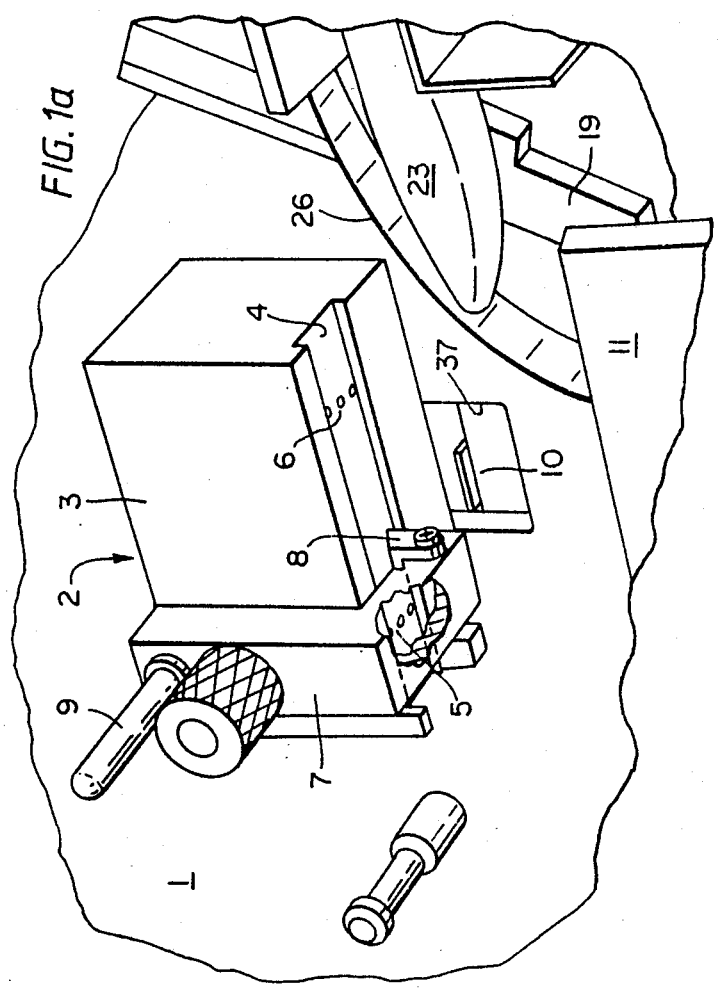

START

EXTRACT LEADER

START OF
FIRST SLITTING

LEADER SLIT

FIRST SPLICE

WIND CYCLE

WIND CYCLE
ENDS—SECOND CUT

LEADER TAIL
PRESENTED

SECOND SPLICE

SPLICING AND LOADING OF TAPE INTO CASSETTES WITH A STATIONARY SPLICING BLOCK

The invention relates to an apparatus and method for splicing and loading of tape into cassettes.

Magnetic tape cassettes (e.g. audio and video tape cassettes) are supplied commercially either as blank tape or as pre-recorded tape. In both cases, the cassette comprises two rotatable hubs, two lenghts of leader tape one secured to each hub and a predetermined length of magnetic tape having its ends spliced to the two leaders.

In manufacture of a cassette of tape, magnetic tape is loaded to a leadered cassette, ie a cassette containing a relatively short length of leader secured by one end to one hub and by the other end to the other hub. Such a leadered cassette for audio use is known as a "C-zero cassette" whllst such a cassette constructed for video use is known as a "V-zero cassette". The first step in loading is to cut the leader into two separate leader lengths. The magnetic tape to be loaded is then spliced to one length of leader and the hub to which that leader length is connected is rotated to wind a predetermined length of magnetic tape onto the same hub. The magnetic tape is then cut and its trailing end spliced to the leading end of the remaining leader length so that the two hubs are connected by a leader-magnetic-leader continuous tape sequence.

The above sequence of operations can be carried out as hand work, but in modern practice the operation is mechanised to provide manufacturing speed and uniform product qualilty. A typical apparatus for performing these operations is disclosed in U.S. Pat. No. 3,637,153. This apparatus comprises means for holding a supply reel of magnetic tape, means for supporting a tape cassette (e.g. by its hubs), a splicing assembly comprising a stationary splicing head and first and second movable splicing heads which are alternately moveable into contiguous relation with the stationary splicing head, means for releasably holding tape ends on the stationary and moveable splicing heads, means for slitting tape supported by the splicing assembly, means for rotating the supply reel and one of the cassette hubs to cause magnetic tape spliced to a leader on the hub to be unwound from the supply reel and wound on the hub in question, and means for applying splicing tape to the abutting ends of leader and magnetic tapes supported by the splicing assembly. In operation, cassette loading commences with the leader ends (i.e. a cut hub-hub leader length) held on the contiguously disposed stationary head and first splicing head, respectively, and the end of the magnetic tape held on the second splicing head. The first moveable splicing head is then moved away from the stationary splicing head and the second moveable head with its held end of the magnetic tape is moved into contiguous relation with the stationary head. This brings the leader held on the stationary head into end-to-end abutment with the magnetic tape and the two are then spliced together. The spliced leader magnetic tape is then wound onto the cassette hub to which the leader is secured and winding continued until a predetermined length of magnetic tape has been loaded onto the hub. The magnetic tape is then slit. The second moveable splicing head, which continues to hold the leading edge of the magnetic tape supply, is then moved away from the stationary head leaving a trailing end of magnetic tape from the newly loaded cassette held by the stationary head. Moving the first moveable splicing head back into contiguous relation with the stationary head juxtaposes the leading end of the remaining cut leader length in abutment to the trailing end of magnetic tape held on the stationary head. These two ends are then spliced to complete the production of a loaded cassette. The apparatus described in U.S. Pat. No. 3,637,153 includes control means for selectively operating the components of the apparatus to perform the above-described operations in the sequence given.

According to the invention, a method of loading a leadered cassette with use tape comprises disposing an end of a terminal portion of a use tape upon a fixed splicing surface; releasably retaining said end in such disposition; extracting leader tape from a leadered cassette supported so that its hubs may be rotated; disposing the extracted leader tape so that said leader tape is in allgnment with said use tape terminal portion and is juxtaposed with respect to the use tape end, a first integral portion of the length of said extracted leader tape being releasably retained upon said fixed splicing surface and secured to a first hub of the cassette by its end and a second integral portion of the length of said extracted leader tape being releasably retained by tape retaining means and secured to a second hub of the cassette by its end; slitting the leader tape across its lateral dimension so that said leader tape is divided into said first and second portions at the location of said use tape end, the resulting trailing end of said first leader tape portion being essentially in abutment with the use tape end; applying splicing tape to the essentially abutting ends, the splicing tape application taking place against the fixed splicing surface to splice the first leader tape portion to the use tape; rotating the first hub of the cassette to draw said first leader tape portion and said use tape across the fixed splicing surface and into the cassette; terminating rotation of said first hub when a predetermined length of said use tape has been drawn into the cassette; slitting the use tape across its lateral dimension whilst releasably retaining said use tape upon said fixed splicing surface and releasably retaining the trailing end of said use tape on said fixed splicing surface; whilst the leading end of said second leader tape portion is held essentially abutted with respect to the so-retained trailing end of said use tape by said tape retaining means, applying splicing tape to the essentially abutting ends to splice the second leader tape portion to the use tape upon the fixed splicing surface; taking slack tape into the cassette; and removing the loaded cassette from its support.

Conveniently, the end of the terminal portion of the use tape is releasably retained on the splicing surface by applying a vacuum through perforations in said surface.

In an embodiment of the invention, leader extraction is effected by operation of leader extraction means comprising a first member for engaging the first leader tape portion and bringing said first portion into contact with said splicing surface and a second member for engaging the second leader tape portion and defining said further surface on which said leader tape is releasably retained.

Preferably, the second leader tape portion is releasably retained on said further surface by applying a vacuum through perforations in said surface.

Advantageously, the leading end of said use tape after slitting thereof is releasably retained on said splicing surface so that a further cycle of operations can be commenced after removal of the leader cassette from its support.

It will be appreciated from the above that the two splicing operations are effected without the use of moveable splicing surfaces in addition to the stationary splicing surface in U.S. Pat. No. 3,637,153. The splicing of the first leader tape portion to the user tape is accomplished according to the invention by bringing the leader tape into close proximity or near contact with the use tape end, slitting the leader tape at the locality of the use tape end and then splicing the resulting two ends together whilst both are releasably retained on the stationary splicing surface. The two ends essentially abut one another (i.e. they confront one another in close proximity) so that accurate splice gapping within the specification applicable to recording/playback hardware can consistently be accomplished. In previous techniques, butting of the leader and user tape ends depended on accurate alignment of the fixed stationary splicing surface with respect to the movable splicing surfaces and this lead to inaccuracy in splicing. Splicing pressure on a movable splicing surface also led to yield and consequent uneven adhesion of splicing tape as between the butted end held on the stationary splicing surface and that held on a movable surface.

In a second aspect of the invention there is provided an apparatus for loading a leadered cassette with use tape comprises a splicing station said splicing station, comprising a stationary fixed splicing surface, tape slitting means for traversing said surface to slit tape across its lateral dimension and means to retain each so-slit tape length releasably on said splicing surface; means for supporting a leadered cassette; means for rotating a hub of the cassette to draw tape onto said hub; leader extraction means for extracting leader tape from said cassette, said means including extraction arm means having a first position in which said arm means is receivable beneath leader tape at the mounth of the cassette and a second position in which the arm means has been raised to bring a first integral portion of the length of said leader tape secured to said hub to said stationary fixed splicing surface, said leader extraction means further including a lift member having a first position in which a second portion of the length of said leader tape is juxtaposed by said lift member to said splicing surface and a second position in which said second portion is removed from said splicing surface; splicing means to apply splicing tape to essentially abutted tape end to splice said ends together upon the fixed splicing surface; and means for supplying use tape and splicing tape to said splicing station.

One particular embodiment of the invention will now be described, by way of example only, reference being made to the accompanying drawings in which:

FIGS. 1a and 1b show the apparatus according to the present invention from two different positions, in both cases in part only; and FIGS. 2a to 2i show the splicing station of the apparatus at various stages of the operating sequence involved in loading a V-zero cassette.

The apparatus shown in FIGS. 1a and 1b comprises a front plate 1 mounted to a chassis (not shown), the front plate 1 assisting to define a housing (not shown) in which control means, electrical motive power means, motive power transmission, a vacuum source and a pneumatic power source (all not shown) are housed.

Securely mounted to front plate 1 is a splicing head 2 comprising a solid metallic block 3 grooved on its undersurface with a longitudinal tape-receiving inverted groove 4. Two sets of three perforations open at the groove surface to provide vacuum shoes 5 and 6 and are connected to the vacuum source within the housing. A tape slitting head 7 mounting a blade 8 cooperates with the grooved undersurface of block 3 and is mounted for reciprocatory movement across the groove 4 perpendicular to the plane of front plate 1 by means of fixed shaft 9 upon which slitting head 7 slides. Movement of slitting head 7 is accomplished by displacement of an attached piston (not shown) operated from the pneumatic power source. A cross-groove (not shown) in the block 3 intersects groove 4 perpendicular thereto and provides a path for blade 8 to pass across groove 4 in slitting, without contacting the material of the block 3, between vacuum shoes 5 and 6.

A splicing arm 10 operates beneath the groove 4. Arm 10 has a retracted position in which it is withdrawn into the housing through the splicing arm orifice 31 in the front plate 1, and an operating position in which the arm is displaced from the housing to apply a short length of splicing tape cut from a supply within the housing to abutting tape ends disposed in groove 4. Splicing arm 10 is powered from the vacuum source referred to earlier and operates in conventional manner known in the art.

Adjacent the base of front plate 1, a cassette holder 11 is mounted to a piston 12 for displacement under power from the pneumatic power source between a cassette-receiving position (FIGS. 1a and 1b) in which the holder is relatively forward of plate 1 to facilitate charging of a V-zero cassette thereto, and a cassette-holding position (FIGS. 2a to 2i) in which the cassette body is proximate the front plate 1 between inner and outer plates 13 and 14 and ready for a tape loading sequence to begin.

Two driven hubs 15 and 16 engage the spool sockets (not shown) when the cassette holder is in the cassette-holding position just referred to, hub 15 penetrating opening 17 provided for the purpose in the inner plate 13 of the cassette holder 11. The two hubs 15 and 16 terminate driven shafts (not shown) disposed within the housing and powered from the electrical motive power means (i.e. a wind motor) in conventional manner.

Figure 2A:
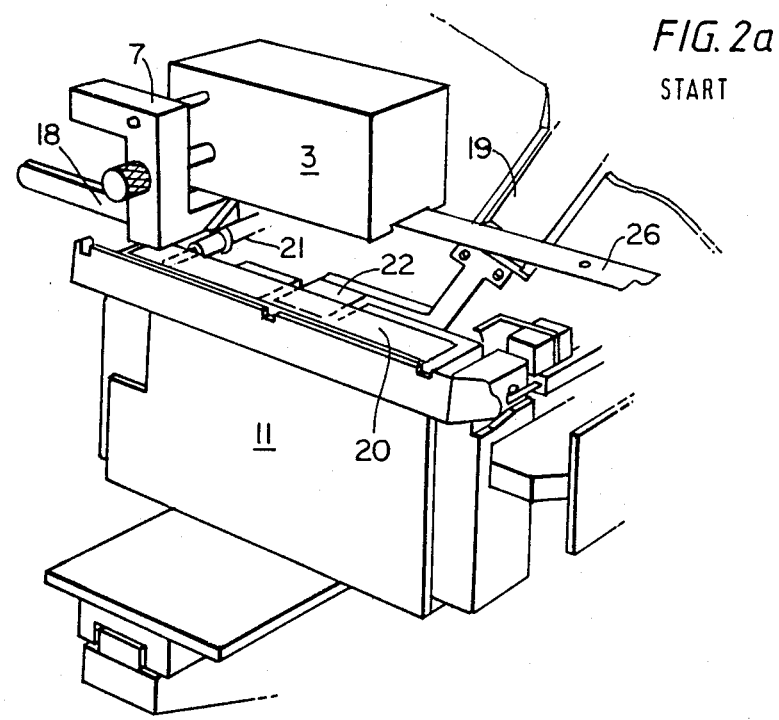
Figure 2B:
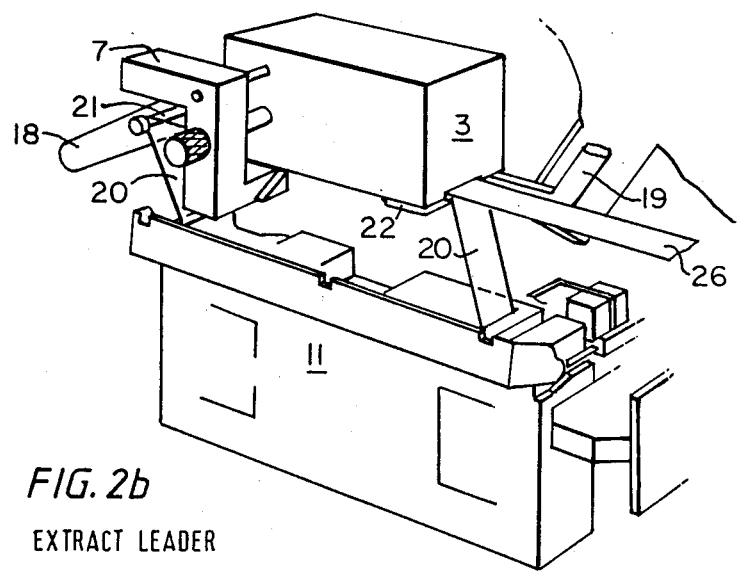

In the cassette-holding position, leader extraction arm 18 and lift arm 19 are received adjacent the underside of cassette leader tape 20, as shown most clearly in FIG. 2a. Both leader extraction arm 18 and lift arm 19 are displaceable, from the positions just referred to, to withdraw leader tape 20 from the V-zero cassette and dispose it within groove 4 of the splicing head 2 (FIG. 2b), both arms being powered for two-direction movement from the pneumatic power source referred to earlier in conventional manner, for example by using a pnuematic piston-and-cylinder assembly and a ball slide. Leader extraction arm 18 is equipped with a cylindrical tape-contacting guide 21 whilst lift arm 19 terminates in a vacuum shoe 22 by which tape is retained on its surface by suction. A slack arm 23 (not shown in FIGS. 2a to 2i in the interests of simplicity and clarity of depiction for the other parts) is mounted for reciprocatory movement parallel to the plane of front plate 1, slack arm 23 again being powered from the pneumatic power source.

The slack arm 23 serves to engage extracted leader tape 20, drawing an excess thereof from the V-zero cassette and then slackening slightly so that it can be ensured that leader tape in groove 4 is not under tension during slitting and splicing. The slack arm 23 also controls the position of cut.

Magnetic tape 26 for supply to the V-zero cassette is supplied from a supply reel and is transported to the splicing head 2 via a system of capstans and guides, as will be seen from FIG. 1b of the drawings, including a rubber capstan 25. A terminal or leading end 27 of magnetic tape 26 is disposed in the groove 4 of block 3 of the splicing head 2.

In operation of the apparatus shown in the drawings, leading end 27 of magnetic tape 26 is first guided around the capstan and guide system to the splicing head 2, where it is held in position by means of vacuum supplied to each of vacuum shoes 5 and 6. Slitting head 7 then operates and the cut-off tape end is removed and discarded.

A V-zero cassette is then loaded to cassette holder 11 and the holder 11 then displaced inwardly on piston 12.

Leader extraction arm 18 and lift arm 19 are then energized and move to the top of their strokes. The effect of this is to extract leader tape 20 and dispose it in groove 4 so that the leading end 27 of magnetic tape 26 is spaced about 0.25 mm from the surface of the leader tape (FIG. 2b), the vacuum shoe 22 of lift arm 19 at the top of its stroke falling similarly short of the downwardly facing surface or celling of groove 4.

Lift arm 19 activates a microwitch (not shown) at the top of its stroke, thus activating an air-controlled stop on the slide of the lift arm. The stop defines a position intermediate the lowest position of the stroke of arm 19 and the top of its stroke (as represented in FIGS. 2d to 2g).

With leader tape 20 disposed in the groove 4 of splicing head 2, the slack arm 23 conditions the cassette (i.e. the arm 23 is operated to take up leader tape 20 on one of the cassette spools).

When the lift arm 19 has been energized and reaches the top of its stroke, a delay is started after which vacuum is applied to vacuum shoes 5 and 6 in the groove 4 of block 3 and vacuum shoe 22 of lift arm 19 is switched on. This stage in the operating sequence is, of course, also represented by FIG. 2b.

Figure 2C:
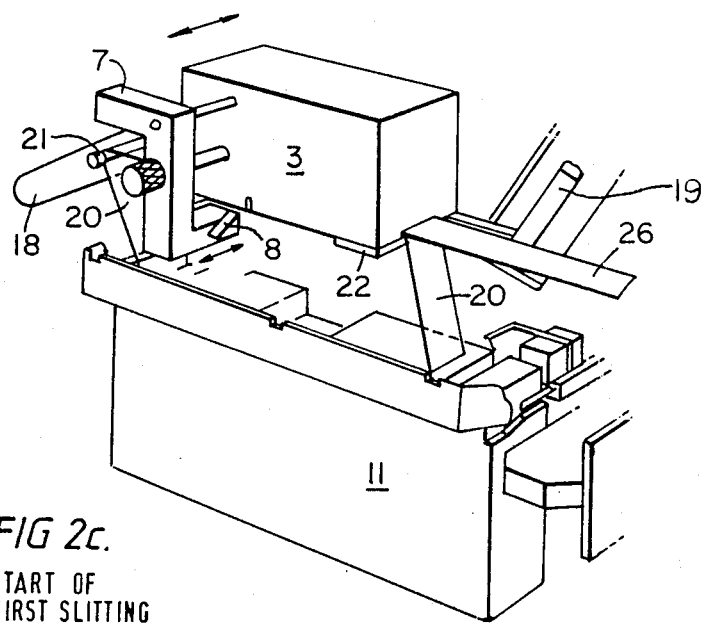
Figure 2D:
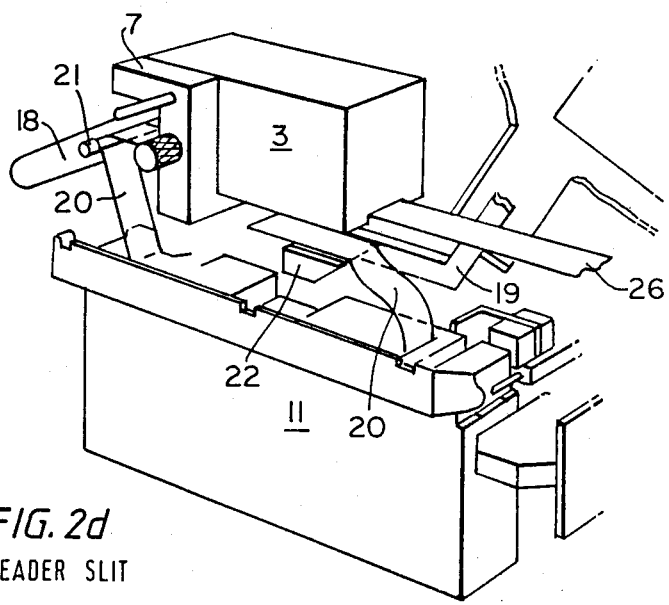

After an additional delay, slitting head 7 is activated causing it to move from its rest position, in which it is clear of block 3, towards front plate 1 and then to reciprocate to its rest position (FIG. 2c).

This slits leader tape 10 at the location of magnetic tape leading end 27 into a first or forward length which can be wound by hub 15 and a second length secured to the other spool of the V-zero cassette.

The lift arm 19 and leader extraction arm 18 are then de-energized causing them to drop under pneumatic force to their stops previously referred to. Vacuum shoe 22 is left switched on (FIG. 2d) to retain the second length of leader tape 20, the first length of leader tape 20 being retained on the groove surface by vacuum shoe 6 and the use tape 26 being retained, with its leading end 27 butted to the trailing end of the first length of leader tape 20, in groove 4 by vacuum shoe 5.

Figure 2E:
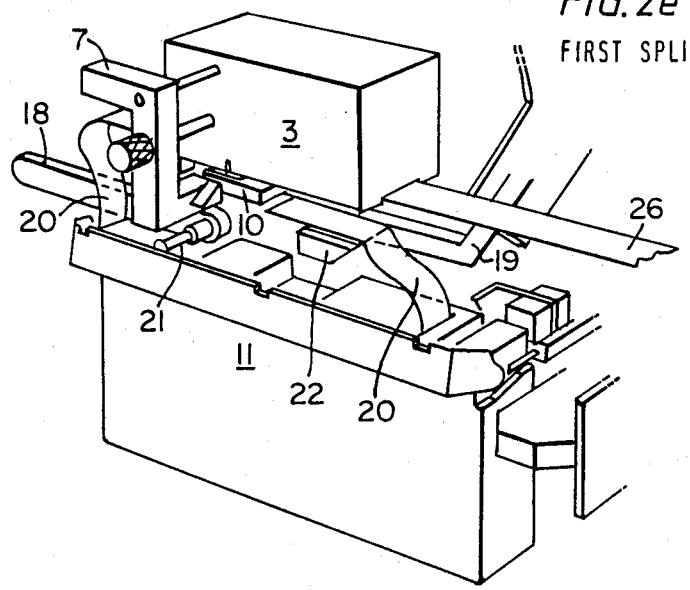

With the butting ends of the magnetic tape 26 and first or forward length of leader tape 20 retained in the above manner in groove 4, the splicing arm 10 is activated to adhere a short length of splicing tape over the butting ends and thereby splice the two lengths together (FIG. 2e).

Figure 2F:
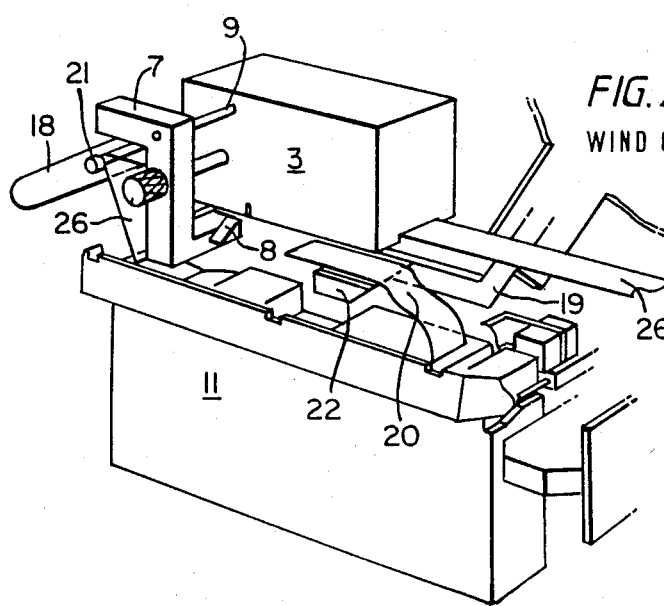

Leader extraction arm 18 is then again raised into leader tape contact and, with splicing arm 10 retracted, a wind cycle is commenced, vacuum continuing to be applied to vacuum shoe 22 but vacuum shoes 5 and 6 being deprived of vacuum so as to release the now spliced tape, by activating the wind motors driving hub 15 (FIG. 2f). When a predetermined length of magnetic tape has been spooled into the cassette, the wind cycle stops and vacuum shoes 5 and 6 are re-activated (FIG. 2f).

Figure 2G:
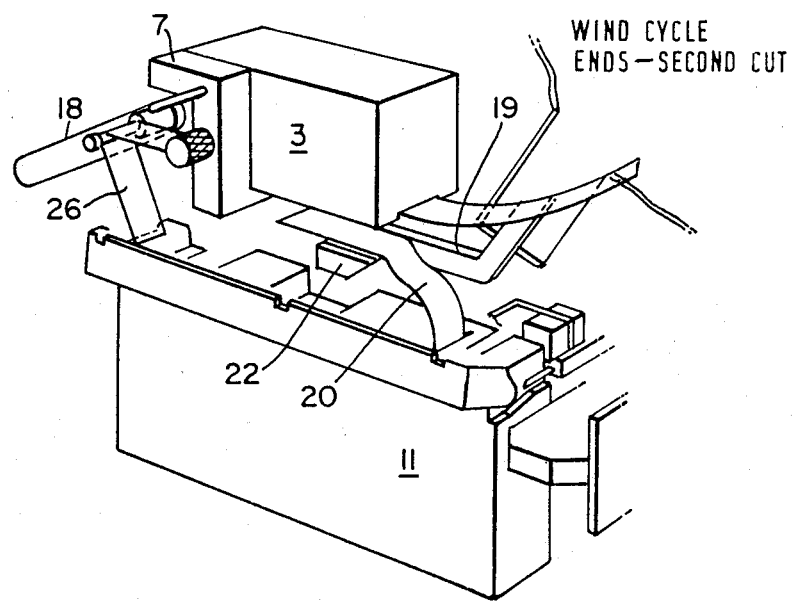
Figure 2H:
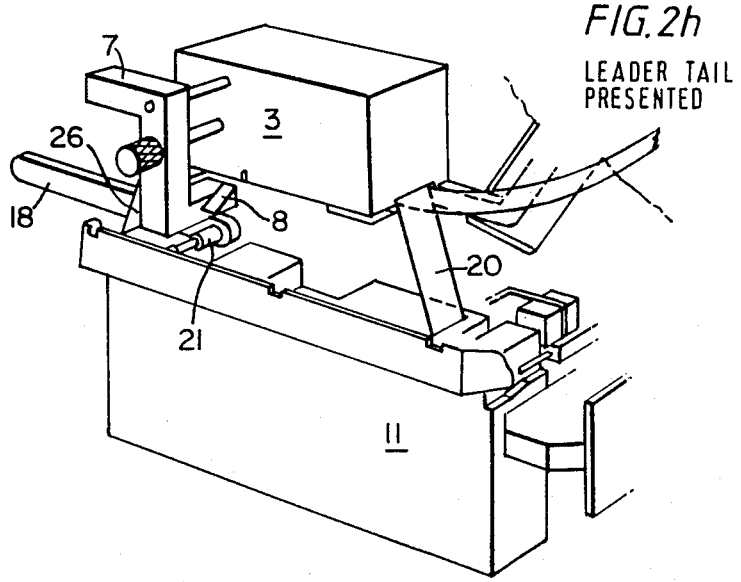

With a continuous length of magnetic tape 26 now retained in groove 4 by the vacuum shoes 5 and 6, a second slitting sequence is commenced to slit the use tape into two lengths (FIG. 2g). Lift arm 19 is then activated to raise the leading end of the leader tape 20 (i.e. the second leader tape length referred to earlier) into close proximity (i.e. about 0.25 mm away from the celling of groove 4) to the length of cut magnetic tape terminating in the leading end from the supply reel; leader extraction arm 18 is also de-energized (FIG. 2h). In this condition, the leader tape positioned as described has its end essentially butted to the end of the magnetic tape 26 trailing from the hub 15 of the cassette.

Figure 2I:
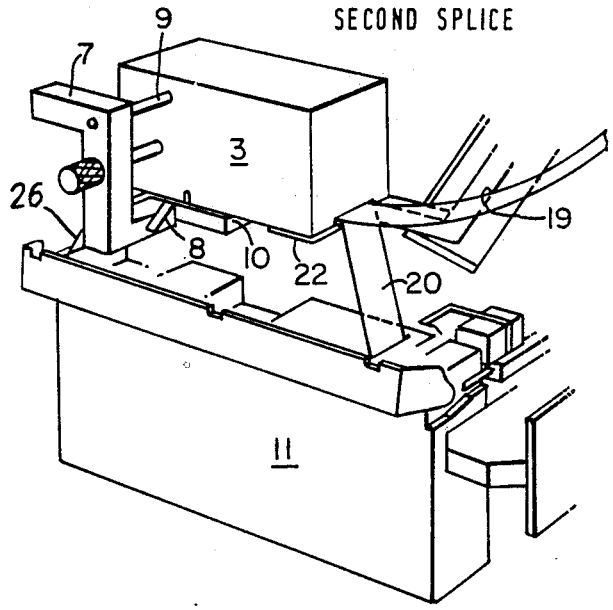

A second splicing operation is then effected by activating splicing arm 10 a second time to splice together the trailing end of magnetic tape 26 and the leading end of the leader tape 20 from the other spool of the cassette (FIG. 2i). Further winding at hub 15 after retraction of splicing arm 10, de-activation of vacuum shoe 5 and de-activation of lift arm 19 to the lowest position of its stroke draws the slack loop of tape into the cassette leaving only leader tape exposed at the mouth of the cassette. Continued activation of vacuum shoe 6 retains the leading end of magnetic tape 26 from the supply reel within groove 4 in readiness for a further cycle of operations to be conducted with a fresh V-zero cassette.

In past practice, butting of the leader tape to the magnetic tape depended on the accurate alignment of a fixed block to each of two movable blocks (known as shift blocks) both in terms of straightness and height from front plate 1. The apparatus of the invention described above with reference to the drawings relies only on the accurate alignment of the height of the lift arm 19 from the front plate 1. In addition, the right hand leader extract arm of previous equipment was by necessity thin in order for it to move up down behind the cassette being wound. This led to problems of distortion making accurate alignment of the guide on the arm difficult to maintain. The lift arm 19 is rigidly attached to the slide, thus avoiding this problem. Splicing takes place in the apparatus of the invention on a solid fixed block (i.e. block 3); before the apparatus of the invention, splicing always took place partly on a fixed block and partly on a shift block which yielded under impact from the splicing arm so as to lead to differential adhesion of the splicing tape.

Whilst in the foregoing, a preferred embodiment of the invention has been described, it will be appreciated various modifications thereto may be made without departing from the spirit of the invention. Thus, for example, whilst leader extraction has been referred to as resulting in near contact of the extracted leader with the use tape end retained upon the splicing surface, it is envisaged that actual contact may occur.

Whilst leader extraction has been referred to as resulting in near contact of the extracted leader with the use tape end retained upon the splicing surface, it is envisaged that actual contact may occur. Whilst the scope of the inventiuon should not exclude methods and apparatus where this circumstance is the case, it should be understood that in practice spacing apart by a small distance is the preferred arrangement (e.g. about 0.25 mm).

I claim:

1. A method of loading a leadered cassette with use tape which method comprises disposing an end of a terminal portion of a use tape upon a fixed splicing surface; releasably retaining said end in such disposition; extracting leader tape from a leadered cassette by means of leader extraction means, the cassette having a mouth for access to leader tape thereof, said cassette being supported with its mouth adjacent and generally parallel to said fixed splicing surface and so that its hubs may be rotated; disposing the extracted leader tape by means of said leader extraction means so that said leader tape is in alignment with said tape terminal portion and is juxtaposed with respect to the use tape end, a first integral portion of the length of said extracted leader tape being releasably retained upon said fixed splicing surface and secured to a first hub of the cassette by its end and a second integral portion of the length of said extracted leader tape being releasably retained by tape retaining means of said leader extraction means and secured to a second hub of the cassette by its end; slitting the leader tape across its lateral dimension so that said leader tape is divided into said first and second portions at the location of said use tape end, the resulting trailing end of said first leader tape portion being essentially in abutment with the use tape end; and said second leader tape portion being retained by said tape retaining means of said leader extraction means at a location spaced from the essentially abutting ends of said use tape and said first leader tape portion; applying splicing tape to the essentially abutting ends of said use tape and said first leader tape portion, the splicing tape application taking place against the fixed splicing surface and with said essentially abutting ends both supported upon said fixed splicing surface to splice the first leader tape portion to the use tape; rotating the first hub of the cassette to draw said first leader tape portion and said use tape across the fixed splicing surface and into the cassette; terminating rotation of said first hub when a predetermined length of said use tape has been drawn into the cassette; slitting the use tape across its lateral dimension whilst releasably retaining said use tape upon said fixed splicing surface; whilst releasably retaining the trailing end of said use tape upon said fixed splicing surface and whilst the leading end of said second leader tape portion is held essentially abutted with respect to the so-retained trailing end of said use tape by said tape retaining means of said leader extraction means, applying splicing tape to the essentially abutting ends of said use tape and said second leader tape portion to splice the second leader tape portion to the use tape, the splicing tape application taking place against the fixed splicing surface and with said essentially abutting ends of said use tape and said second leader tape portion both supported upon said fixed splicing surface; taking slack tape into the cassette; and removing the loaded cassette from its support.

2. A method as claimed in claim 1 wherein the end of the terminal portion of the use tape is releasably retained on said fixed splicing surface by applying a vacuum through perforations in said surface.

3. A method as claimed in claim 1 wherein leader extraction is effected by operation of leader extraction means comprising a first member for engaging the first leader tape portion and bringing said first portion into contact with said fixed splicing surface and a second member for engaging the second leader tape portion and defining retaining means by which said leader tape is releasably retained.

4. A method as claimed in claim 3 wherein the second leader tape portion is releasably retained by applying a vacuum through perforations in a surface of said retaining means.

5. A method as claimed in claim 1 wherein the leading end of said use tape, after slitting thereof, is releasably retained on said fixed splicing surface so that a further cycle of operations can be commenced after removal of the loaded cassette from its support.

6. A method as claimed in claim 1 wherein said use tape terminal portion is retained on a first portion of said splicing surface and its end is adjacent the junction of said first surface portion with a second splicing surface portion and wherein said first portion of said extracted leader tape is retained on said second splicing surface portion and said leader tape is slit at the said junction of the two surfaces.

* * * * *